Figure 1:
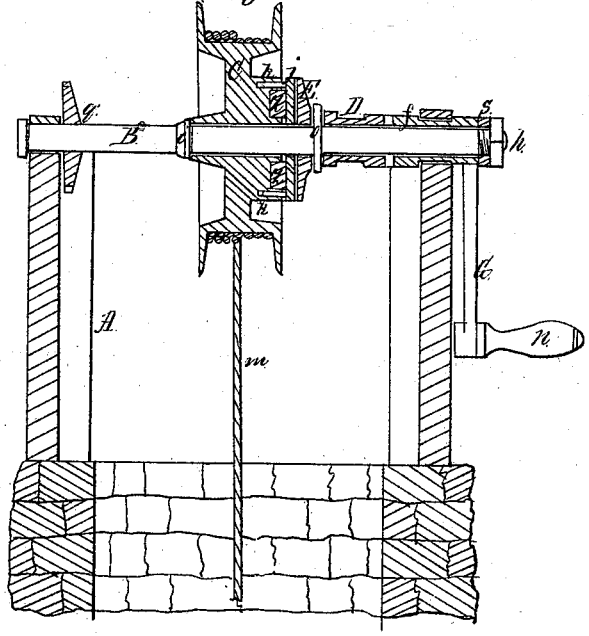
Figure 2:
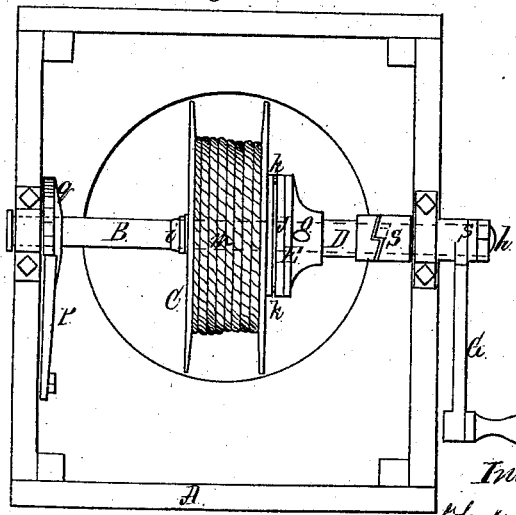

F. H. Jones,
Windlass Water Elevator,
Nº 63,800. Patented Apr. 16, 1867.

United States Patent Office.

F. H. JONES, OF ATTICA, NEW YORK.

Letters Patent No. 63,800, dated April 16, 1867.

IMPROVEMENT IN WINDLASS FOR WELLS.

*The Schedule referred to in these Letters Patent and making part of the same.*

TO ALL WHOM IT MAY CONCERN:

Be it known that I, F. H. JONES, of Attica, in the county of Wyoming, and State of New York, have invented a new and useful Improved Windlass for Wells, &c.; and I do hereby declare that the following is a full and exact description thereof, reference being had to the accompanying drawings, making part of this specification, in which—

Figure I is a central vertical section of my improvement applied to a well.

Figure II is a plan of the same.

Like letters of reference designate corresponding parts in both figures.

My invention is designed more especially for raising and lowering the bucket of wells, the latter operation being accomplished without requiring the reverse motion of the crank, which remains at rest; and it consists of a sleeve, to which the crank is attached, provided with a friction surface at its end, which engages with a similar one on the drum, combined with a spring to press the two surfaces together, the sleeve being provided with a clutch or coupling, which operates to wedge the friction surfaces together, so as to prevent slipping in elevating the bucket, but which, by a partial turn of the crank in an opposite direction, will sufficiently relieve the pressure between the friction surfaces, so as to allow the drum upon which the rope is wound to turn upon its shaft, the friction being so regulated as to cause the bucket to descend gradually, without the inconvenience attending the ordinary methods, where the crank has to be reversed.

In the drawings, A represents the ordinary curb of a well; B, the axis; C, the drum; D, the sleeve, with a friction disk or surface, E, at its inner end; $f$, the wedge coupling, to outer portion of which is attached the winch or crank G, provided with a handle, $n$. The drum or wheel C fits loosely, so as to turn on the shaft B, and is retained in place on the same by a flange, $i$, on one side, and by the pressure of the disk E on the other. In contact with this disk is a corresponding one, $j$, provided with pins $k'k$, fitting in corresponding sockets in the wheel C, so as to allow a slight adjustment to and from the wheel, for a purpose presently to be described. Any other suitable means for connecting this disk to the wheel, and still allow the required adjustment, may be employed. Between the disk $j$ and the drum C is interposed a ring of India rubber, Z, fitting in a concentric groove in the end of the wheel or drum, which presses the disk $j$ against disk E, so as to cause the requisite friction between the two, and thereby prevent the too rapid descent of the bucket, which is connected with the drum C by the ordinary rope or chain $m$. Spiral or other springs may be used instead of the rubber, and perform substantially the same function. The amount of friction between the two disks may be regulated by a screw, $h$, at the end of the shaft, which may be tightened, causing an increased pressure. A washer, $s$, may be employed between this nut and the crank. The disk E is prevented from turning on the axis B by a pin, $o$, the hole through the collar of the former being slightly elongated to allow of the adjustment above described. The clutch or coupling $f$ of the sleeve is constructed as shown in Fig. II. It is represented in black lines in the position for allowing the descent of the bucket. To elevate the bucket the winch is given a sudden start or impulse, which causes the outer portion of the sleeve, connected with the crank, to wedge the portion D (as shown in red lines) and disk E against the corresponding disk $j$ with sufficient force to cause the latter and the drum to which it is connected to revolve, which winds up the rope to which the bucket is attached. A pawl, $p$, which engages with the ratchet-wheel $q$, mounted on the shaft B, prevents the rotation of the latter in an opposite direction, and thereby sustains the bucket till it is released by the return of the clutch to its normal position, which sufficiently diminishes the pressure between the disks to allow the rope to unwind by the revolution of the drum on the shaft B, which now remains stationary with the crank. The use of my improvement not only obviates the labor and inconvenience attending the unwinding of the rope by the usual reverse movement of the winch, but also prevents the liability of injury to the bucket and other parts by the too rapid descent of the former.

What I claim as my invention, and desire to secure by Letters Patent, is—

The loose drum C and windlass-shaft B, in combination with the disks $j$ and E, spring Z, sleeve D, clutch $f$, winch G, and adjusting-screw $n$, arranged and operating substantially in the manner and for the purpose set forth.

In witness whereof I have hereunto signed my name in the presence of two subscribing witnesses.

F. H. JONES.

Witnesses:
JAY HYATT,
JAMES C. BROWN.